United States Patent [19]

Kobayashi

[11] Patent Number: 4,915,920

[45] Date of Patent: Apr. 10, 1990

[54] DRY METHOD OF PURIFYING FLUE GAS

[76] Inventor: Yoshio Kobayashi, 543-10 Shichiyama, Kumatori-cho, Sennan-gun, Osaka, Japan

[21] Appl. No.: 281,771

[22] Filed: Dec. 8, 1988

[30] Foreign Application Priority Data

Dec. 9, 1987 [JP] Japan ................................ 62-311406

[51] Int. Cl.$^4$ .......................... B01J 8/00; C01B 21/00; C01B 17/00
[52] U.S. Cl. ..................................... 423/239; 423/244
[58] Field of Search ............... 423/239, 239 A, 244 A, 423/244 R

[56] References Cited

U.S. PATENT DOCUMENTS

| | | | |
|---|---|---|---|
| 4,324,770 | 4/1982 | Bakkr | 423/244 |
| 4,571,330 | 2/1986 | Krigmont et al. | 423/244 |
| 4,710,365 | 12/1987 | Gebhard et al. | 423/244 |
| 4,726,940 | 2/1988 | Kobayashi | 423/210 |

FOREIGN PATENT DOCUMENTS

| | | |
|---|---|---|
| 209038 | 9/1986 | Japan. |
| 97640 | 5/1987 | Japan. |
| 183839 | 8/1987 | Japan. |
| 213842 | 9/1987 | Japan. |
| 254824 | 11/1987 | Japan. |

OTHER PUBLICATIONS

Report of 1986 Symposium Sponsored by EPA and EPRI; "Development and Pilot Plant Evaluation of Silica-enhanced Lime Sorbents for Dry Flue Gas Desulfurization", by W. Jozewicz et al.
Thermal and Nuclear Power Engineering Society, Hokkaido Branch Symposium, Mar. 19, 1986.

Primary Examiner—Gregory A. Heller
Attorney, Agent, or Firm—Lowe, Price, LeBlanc, Becker & Shur

[57] ABSTRACT

A dry method is provided for purifying a flue gas containing $SO_x$, $NO_x$, steam and oxygen and includes the steps of injecting a fine powder of limestone into a coal-fired boiler furnace for desulfurization, collecting spent fine powder discharged from the coal fired boiler furnace, treating the spent fine powder with water and steam to prepare porous compound sorbent particles, injecting the compound sorbent powder into the flue gas of a temperature of 75° to 220° to disperse the same, and separating the dispersed compound sorbent powder from the flue gas upon desulfurization reaction thereof with the flue gas, by dust collection means.

7 Claims, 4 Drawing Sheets

DRY METHOD OF PURIFYING FLUE GAS

BACKGROUND OF THE INVENTION

1. Field of the Invention

The present invention relates to a dry method of purifying an flue gas, and more particularly, it relates to a dry method of purifying an flue gas containing $SO_x$, $NO_x$, steam and oxygen.

2. Description of the Background Art

Flue gas discharged from a boiler or an incinerator typically contains toxic acid substances such as sulfur oxide ($SO_x$), HCl, HF and nitrogen oxide ($NO_x$) generally in concentrations of 10 to 3000 p.p.m. It is compulsory to remove such substances for environmental protection. $SO_x$, HCl and HF are generally removed by a method of scrubbing the flue gas with an alkaline absorbing solution containing lime or the like. $NO_x$ is generally removed by an improved combustion method or a catalytic reduction method employing a catalyst. However, all of these methods are disadvantageous in that they increase the treatment cost.

The aforementioned wet process may be replaced by a simple semidry process, which can be carried out at a low cost. A method of improving the semidry process was reported in a 1986 symposium sponsored by EPA and EPRI. According to this method, the temperature of the flue gas, which is higher by 10° to 20° C. than that in the wet process, is 65° to 75° C. In this process, a scaling trouble is caused in the flue duct or if the flue gas is insufficiently diffused at the outlet of the stack. Further, unstable waste of $Ca(OH)_2$—$CaSO_3$ results from this method, to exert bad influence on the environment.

In relation to such a background, each of Japanese Patent Laying-Open Gazettes Nos. 209038/1986, 97640/1987, 183839/1987, 213842/1987 and 254824/1987, and Thermal and Nuclear Power Engineering Society, Hokkaido Branch Symposium, Mar. 19, 1986 discloses a new dry method of purifying a flue gas. According to such a new method of purifying a flue gas, a substance is prepared by adding water to a mixture of fly ash, lime and sulfuric acid or gypsum kneading the mixture, and subjected it to steam curing, thereby to prepare a compound sorbent. This compound sorbent is granulated to be 3 to 10 mm in diameter, for example, and filled in a moving bed. A flue gas of a temperature of 50° to 230° C., containing $SO_x$, $NO_x$ and steam, is passed through this moving bed, to be subjected to simultaneous removals of $SO_x$ and $NO_x$. According to this method, the $SO_x$ removal efficiency is at least 90%, while the $NO_x$ removal efficiency is 20 to 70%.

It has been reported that, according to the conventional dry method, the $SO_x$ removal efficiency was 93% when a moving bed was filled with a porous compound sorbent, which was granulated to be 3 to 10 mm in particle diameter, of 2 m$^3$ (1.2 ton) and a flue gas containing $SO_x$ of 290 to 520 p.p.m. was passed through the moving bed at a flow rate of 1000 Nm$^3$/h. The stoichiometric ratio, i.e., the ratio Ca/$SO_x$ of an effective mole number of Ca contained in the compound sorbent to that of $SO_x$ contained in the flue gas, is 1.

According to this conventional method, however, the apparatus employed therefor must have a large capacity because of a low processing speed. Further, the apparatus is complicated since it is necessary to provide a pressure drop in the moving bed. It is reported that, as a result, the treatment cost is not much reduced as compared with the wet process but is about 75% of that in a conventional wet limestone method.

SUMMARY OF THE INVENTION

An object of the present invention is to provide a dry method of purifying a flue gas, which can simultaneously remove $SO_x$ and $NO_x$ at high efficiency through a simple and small apparatus.

The dry purifying method according to the present invention comprises the steps of treating a mixture containing lime, gypsum and fly ash with water and steam to prepar proous compound sorbent particles, injecting the sorbent particles into a flue gas of a temperature of 75° to 220° C. to disperse the same, and separating the dispersed sorbent particles from the flue gas after desulfurization reaction by dust collector means.

The mean particle diameter of the compound sorbent particles is preferably not more than 100 μm, and more preferably, not more than 3 to 20 μm.

The flue gas is at a temperature of 75° to 220° C., preferably 85° to 160° C., and more preferably, 90° to 130° C. in a portion to be exposed to injection of the sorbent particles.

In a preferred embodiment of the present invention, fine powder of limestone are injected into a coal fired boiler furnace to cause desulfurization, and spent fine powder discharged from the coal fired boiler furnace are collected to be treated with water and steam, thereby to prepare porous compound sorbent particles.

In this embodiment, the collected fine powder is preferably classified for removal of coarse fly ash, to be then treated with water and steam.

These and other objects, features, aspects and advantages of the present invention will become more apparent from the following detailed description of the present invention when taken in conjunction with the accompanying drawings.

DETAILED DESCRIPTION OF THE INVENTION

Figure 1:
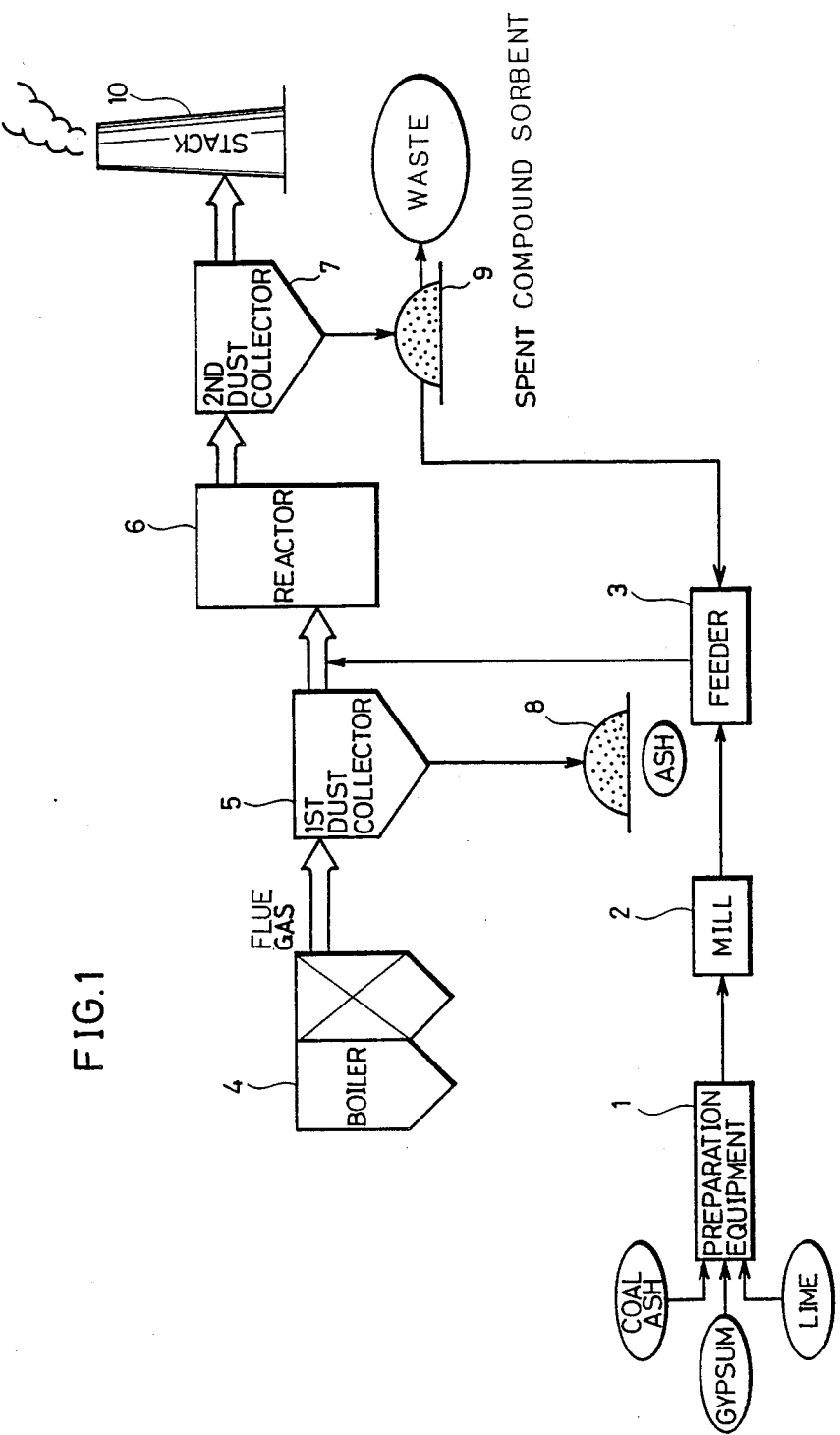
FIG. 1 is a block diagram showing a first embodiment of the present invention.

It may be easily thought of to reduce capacity of an apparatus by decreasing the particle diameter of a compound sorbent for improving its reactivity, thereby to increase the relevant reaction rate. However, it is not practically advantageous to fill a moving bed with a compound sorbent of not more than 1 mm in particle diameter since such reduction in particle diameter leads to increase in pressure drop across the bed.

The inventor has studied a method of suspending fine particles of a compound sorbent, which is excellent in reactivity, in a flue gas and causing reaction, to develop the present invention.

An experiment was made by pulverizing a compound sorbent prepared by adding water to a mixture of lime, gypsum and fly ash, kneading the mixture and performing steam curing in a vessel, injecting the pulverized compound sorbent into a gas of about 140° C. containing $SO_x$, $NO_x$, steam and oxygen and causing solid-gas separation in a dust collector to then conduct a gas analysis. As the result, it has been recognized that a desulfurization reaction rate is increased in inverse proportion to the particle diameter as the compound sorbent is reduced in particle diameter, and that a compound sorbent of about 10 μm in mean particle diameter must be brought into contact with an flue gas for about a hundred second to cause reaction of 90%.

The reaction rate of the above method is considerably slower than that in a well-known furnace desulfurization system, which is a method of injecting fine limestone into a high-temperature combustion furnace. In the furnace desulfurization system, the reaction rate, which is at the inverse square of the particle diameter, is extremely influenced by the particle diameter. The lower limit of a practical mean particle diameter in the furnace desulfurization system is about 1.5 μm, in relation to an agglometration effect of the particles and the cost for pulverization.

In a flue gas desulfurization system of the present invention, on the other hand, the reaction rate, which varies as the inverse first power of the particle diameter, is not so much influenced by the particle diameter. In this case, the lower limit of a practical mean particle diameter is about 3 μm.

On the basis of the above result of experiment, reaction systems were studied for each particle diameter. A fluidized bed system is employed for a compound sorbent of 100 to 1000 μm in mean particle diameter, which value is slightly smaller than that of particles generally employed for a moving bed, in relation to terminal velocity of the particles. In such case, a long residence time in units of 10 hours is required in order to improve utilization of the compound sorbent to about 90%. Thus, dust concentration in the fluidized bed is increased as a matter of course, followed by increase in pressure drop. The amount of dust is also increased to require a large-sized dust collector. Thus, it has been recognized that the fluidized bed system is rather inferior to the moving bed system.

When the particle diameter of the compound sorbent is further reduced to be not more than 100 μm, the terminal velocity is so retarded that the fluidized bed is not formed. The compound sorbent forms an aerosol in a state of suspension in the flue gas. Such a suspending compound sorbent is made to absorb $SO_x$ contained in the flue gas, and collected by a dust collector such as a bag filter. A residence time of several tens to thousands of seconds is required to improve utilization of the compound sorbent to 90%, and the compound sorbent collected by the dust collector must be repeatedly used in the form of aerosol since its utilization is stil insufficient upon single passage. Nevertheless, the aerosol system is yet superior to the moving bed system even if increase in cost required for pulverizing the compound sorbent is counted, since pressure drop caused by such circulation of the compound sorbent is not more than 200 mm Hg at the most and the capacity of the apparatus can be decreased as compared with the moving bed system, to reduce the capital investment.

Although the cost required for pulverization is increased with reduction in particle diameter, the cost for treatment is considerably reduced by the reduction in pressure drop due to low concentration of the aerosol, leading to a great advantage as a whole. Such a tendency holds up to a particle diameter of about 3 μm. In other words, the agglometration effect is improved as the particles are reduced in diameter, and such an effect is considerably facilitated when the particle diameter is not more than 5 μm. Particularly when the particle diameter is not more than 3 μm, the cost for pulverization and classification is abruptly increased, and it is extremely difficult to disperse a large amount of such fine powder in primary particles to form aerosol.

Thus, the mean particle diameter of a compound sorbent employed in the present invention is preferably not more than 100 μm, and more preferably, 20 to 3 μm.

FIG. 1 is a block diagram showing a first embodiment of the present invention. A preparation equipment 1 is adapted to add water to a mixture of fine powder materials of lime, gypsum and fly ash for carrying out steam curing, thereby to prepare a compound sorbent. The compound sorbent thus obtained is pulverized in a mill to be not more than 100 μm, preferably 3 to 20 μm in mean particle diameter. The sorbent particles are injected into the flue gas through a feeder 3, to be dispersed in the same. The compound sorbent particles are conveniently injected into a duct connecting a first dust collector 5 with a reactor 6. The flue gas, which is discharged from a boiler 4, is introduced into the first duct collector 5, so that ash 8 is removed.

The flue gas passed through the reactor 6 is introduced into a second dust collector 7, so that a spent sorbent 9 is separated. After separation by the second duct collector 7, the great part of the recovered spent compound sorbent is reinjected into the duct through the feeder 3, to carry out the removals of $SO_x$ and $NO_x$ so that its utilization reaches a predetermined level, while the remaining part thereof is dispersed as waste. The flue gas subjected to dust removal through the second dust collector 7 is outwardly discharged from a stack 10.

The flue gas exposed to injection of the sorbent particles is at a temperature of 75 to 220° C., preferably 85° to 160° C. Such a reaction temperature is preferably lower for removal of $SO_x$, while slightly higher for removal of $NO_x$. In consideration of a scaling trouble in the duct and diffusion of the flue gas, it is believed that the most preferable temperature is 90° to 130° C., as hereinafter described with reference to Example of the present invention.

Although the sorbent particles are suspended in the flue gas to cause reaction in the reactor 6 in the apparatus shown in FIG. 1, such reaction may be caused in the duct, in place of the reactor 6.

The residence time of the compound sorbent in the flue gas is 1000 seconds at the most. The compound sorbent may be so employed that Ca/$SO_x$ (stoichiometric ratio)=1 to 1.2, to achieve $SO_x$ removal of 90 to 93% and $NO_x$ removal of 20 to 40%.

This desulfurization reaction is caused by the aerosol, and hence desulfurization efficiency is greatly influenced by the state of the aerosol. In a most preferable state of the aerosol for desulfurization, fine primary particles of the compound sorbent are homogenously distributed in the flue gas.

However, the second dust collector 7 may be formed by a bag filter, so that desulfurization is also carried out in a state involving the dust deposited on the surface of the bag filter.

In order to promptly mix the compound sorbent with the flue gas and facilitate dispersion of the primary particles of the compound sorbent, the compound sorbent is preferably mixed with the flue gas is a venturi type passage. The compound sorbent, thus injected, forms an excellent homogenous aerosol.

The above-described method of preparing sorbent particles in a preparation equipment by mixing separately prepared lime, gypsum and fly ash with each other may be combined with a furnace desulfurizing method of directly injecting fine powder of limestone into a furnace of 850° to 1250° C., to attain a superior dry desulfurization method.

Figure 2:
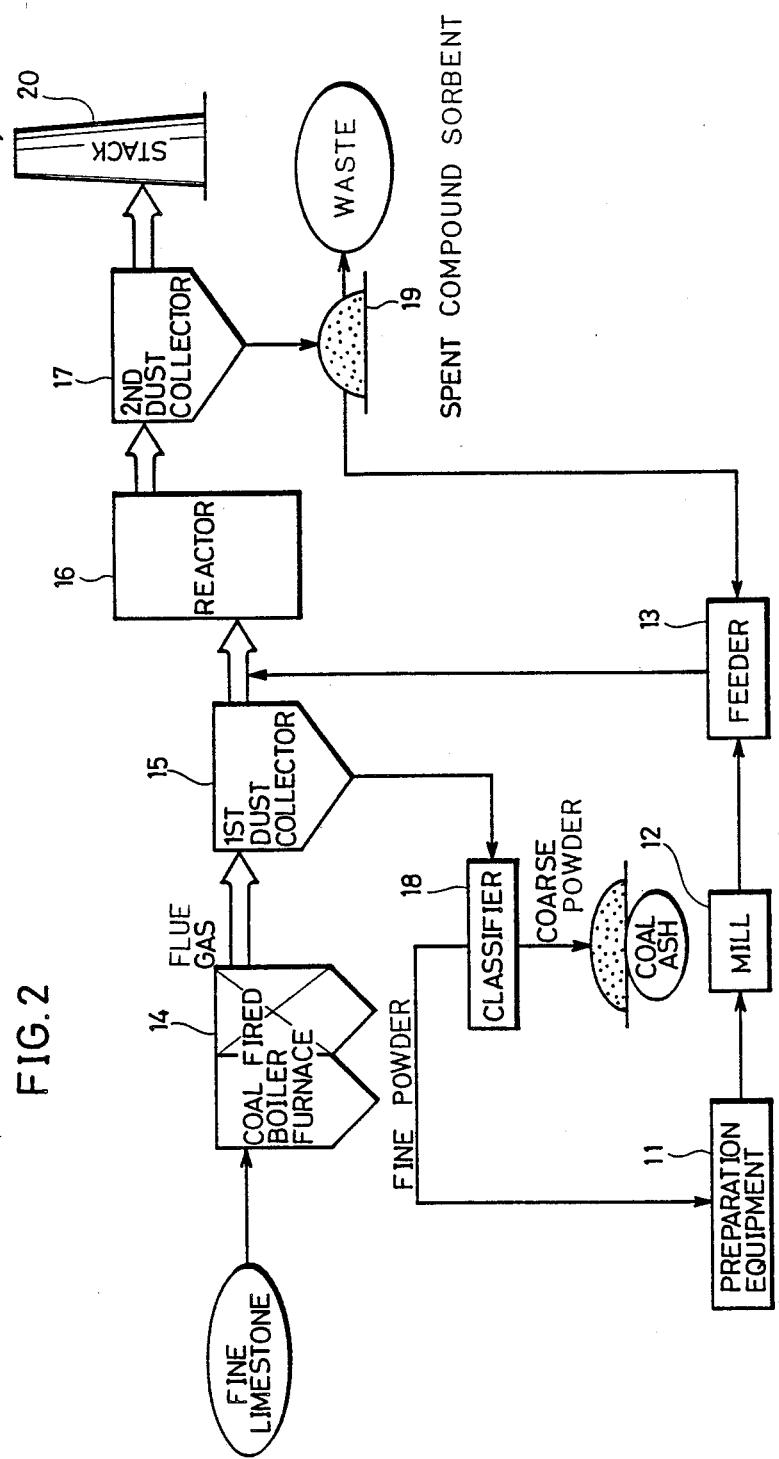
FIG. 2 is a block diagram showing a second embodiment of the present invention.

FIG. 2 is a block diagram showing an apparatus along such a method, in accordance with a second embodiment of the present invention. Referring to FIG. 2, a fine powder of limestone are injected into a coal fired boiler furnace 14 that is at a temperature of of 850° to 1250° C. Thus, $SO_x$ contained in a combustion flue gas partially reacts with lime to provide gypsum, which is then removed. The flue gas contains a mixture of fly ash, quick lime and gypsum. A first dust collector 15 separates the flue gas, to collect the mixture of fly ash, quick lime and gypsum. The collected mixture is supplied to a classifier 18, so that coarse fly ash is separated and residual fine powder of the mixture is supplied to a preparation eqiupment 11. This mixture, containing fly ash, quick lime and gypsum, can be used as a raw material for preparing the aformentioned compound sorbent particles. The compound sorbent thus prepared is pulverized a suitable mill, to be injected into a flue connected a first dust collector 15 and a reactor 16 through a feeder 13. The temperature of the flue gas at an injection part is 75° to 220° C.

Within the reactor 16, removals of $SO_x$ and $NO_x$ are carried out by the compound sorbent particles suspending in the flue gas. The flue gas passed through the reactor 16 is guided to a second dust collector 17. The second dust collector 17 separates spent compound sorbent particles from the flue gas, to lead the flue gas to a stack 20. After separation by the second dust collector 17, the great part of the recovered spend compound sorbent 19 is reinjected into the duct through the feeder 13, to carry out the removals of $SO_x$ and $NO_x$ so that its utilization reaches a predetermined level, while the remaining part thereof is disposed as waste.

In the apparatus shown in FIG. 2, the ratio of the mixture supplied to the preparation equipment 11 can be adjusted in various ways. The ratios of fly ash, lime and gypsum can be adjusted by the classifier 18. The ratio of lime to gypsum can be changed by adjusting the particle diameter of limestone to be injected into the coal fired boiler furnace 14. The amount of quick lime is increased with increase in particle diameter of limestone, while the amount of gypsum is increased with decrease in particle diameter of the same.

It has been recognized that compound sorbent particles prepared from the mixture discharged from the coal fired boiler furnace of the apparatus shown in FIG. 2 are superior to those formed of separately prepared raw materials in the apparaus shown in FIG. 1. It may be considered that this is because the raw material discharged from the coal fired boiler furnace is a homogenous mixture of fine powder consisting of CaO particles whose surfaces are covered with $CaSO_4$ and fine fly ash. It is believed that, this is because such a mixture is further homogenous as compared with that of separately prepared raw materials.

According to the method carried out through the apparatus shown in FIG. 2, the flue gas in the coal fired boiler furnace 14 is desulfurized to some extent by the fine powder of limestone, to be further desulfurized by the compound sorbent particles of high activity. Therefore, $SO_x$ removal of about 90% and slight $NO_x$ removal are simultaneously performed synthetically at an stoichiometric ratio of 1 to 1.2, which is the amount of use of limestone substantially identical to that in the conventional wet process. Thus, this is an inventive epochal method.

Although the raw material for the compound sorbent particles is prepared from the mixture of lime, gypsum and fly ash in the above description, gypsum may be partially or entirely replaced by magnesium nitrate, sodium nitrate, potassium nitrate, calcium chloride, magnesium chloride, strontium chloride, sodium chloride, potassium chloride or the like. The fly ash may be replaced by silicon dioxide or aluminum oxide, or a mixture thereof. Japanese Patent Laying-Open Gazette No. 254824/1987 discloses a compound sorbent having similar desulfurization performance, which is prepared from a material capable of supplying calcium oxide and one, two or more materials selected from a group of those capable of supplying a sulfuric acid compound, a halogen compound, silicon dioxide, aluminum oxide, a sulfide and a hydroxide of an alkali metal. The compound sorbent employed in the present invention may include that disclosed in the aforementioned Gazette.

EXAMPLE

Preparation of Compound Sorbents

Compound Sorbent A

Water of 12 kg was added to gypsum of 12 kg, slaked lime of 25 kg and fly ash of 90 kg to knead the mixture, which was then introduced into a steaming vessel to be subjected to steam curing for about eight hours. Thereafter the mixture was pulverized in a ball mill and classified to prepare a sample $A_1$ of 6.7 $\mu$m, a sample $A_2$ of 18.3 $\mu$m, a sample $A_3$ of 35.5 $\mu$m, a sample $A_4$ of 53 $\mu$m and a sample $A_5$ of 82 $\mu$m in mean particle diameter.

Compound Sorbent B

Compound sorbent particles were prepared by the method shown in FIG. 2. First, fine powder of limestone of 2.8 $\mu$m in mean particle diameter were dispersed through a dispersion nozzle to be injected into a coal fired boiler furnace, thereby to obtain a mixture of fly ash, gypsum and quick lime. This mixture was classified by a classifier, to obtain a mixture of 8.6 $\mu$m in mean particle diameter. This mixture contained free CaO of 15.6%, $CaSO_4$ of 10.4% and a residue substantially consisting of fly ash.

Water of 21 kg was added to the mixture of 100 kg to knead the mixture, which was then introduced into a steaming vessel to be subjected to steam curing for about eight hours. Thereafter the mixture was pulverized by a ball mill and classified, to prepare a sample $B_1$ of 7.2 $\mu$m, a sample $B_2$ of 20.2 $\mu$m, a sample $B_3$ of 34.4 $\mu$m, a sample $B_4$ of 49.8 $\mu$m and a sample $B_5$ of 85.6 $\mu$m in mean particle diameter.

Chemically analyzed values of the aforementioned compound sorbents $A_1$ to $A_5$ and $B_1$ to $B_5$ were substantially identical to each other.

Desulfurization Experiment 1

Figure 3:
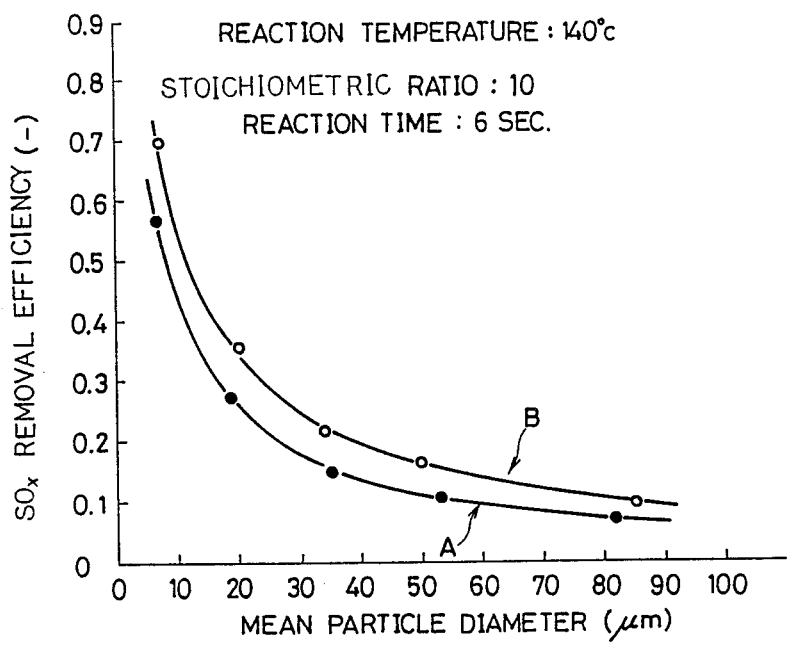
FIG. 3 illustrates relation between diameter of sorbent particles and $SO_x$ removal efficiency in a preferred embodiment of the present invention.

An experimental apparatus having a reaction pipe of 200 mm in inner diameter and 4000 mm in length covered with a steam jacket and a bag filter connected with the same was employed to examine influence exerted by particle diameter. Saturated steam of 4 kg/cm$^2$G was passed through the steam jacket of the reaction pipe to heat the same, while a combustion gas of 140° C., which was composed of $SO_2$ of 200 p.p.m., $NO_x$ of 100 p.p.m. steam of about 8% and $O_2$ of about 7.5% was introduced into the interior of the reaction pipe at a flow rate of 50 Nm$^3$/h. The compound sorbents $A_1$ to $A_5$ and $B_1$ to $B_5$ prepared in the aformentioned manners were injected from an orifice-type nozzle having a hole of 3.5 mm in inner diameter, which was provided at the inlet of the reaction pipe, at a rate of 1.95 kg/h with air, to be dispersed in the combustion gas. $SO_x$ concentration was measured at the outlet of the bag filter to calculate $SO_x$ removal efficiency, which are shown in FIG. 3. In this experiment, the stoichiometric ratio was set at 10 and a reaction time was set at about six seconds.

As shown in FIG. 3, the $SO_x$ removal efficiency is abruptly increased with a mean particle diameter of not more than 20 μm.

Desulfurization Experiment 2

An experimental apparatus identical to that in Experiment 1 was employed to examine the influence exerted by reaction time. A combustion gas of about 140° C. composed of $SO_2$ of 200 p.p.m., $NO_x$ of 100 p.p.m., steam of about 8% and $O_2$ of about 7.5% was introduced into the apparatus at flow rates of 100 Nm$^3$/h, 50 Nm$^3$/h, 40 Nm$^3$/h, 25 Nm$^3$/h and 20 Nm$^3$/h, while the compound sorbents $A_1$ and $B_1$ were correspondingly injected at rates of 1.55 kg/h, 0.78 kg/h, 0.62 kg/h, 0.39 kg/h and 0.31 kg/h respectively to be dispersed in the gas. In this series of experiments, the stoichiometric ratio was set at 4.

On the other hand, a combustion gas of about 140° C. composed of $SO_2$ of 500 p.p.m., $NO_x$ of 250 p.p.m., steam of about 8% and $O_2$ of about 7.5% was introduced into the apparatus at flow rates of 50 Nm$^3$/h, 25 Nm$^3$/h and 20 Nm$^3$/h, while the compound sorbents $A_1$ and $B_1$ were correspondingly injected at rates of 0.58 kg/h, 0.29 kg/h and 0.23 kg/h respectively to be dispersed in the gas. In this series of experiments, the stoichiometric ratio was set at 1.2.

Figure 4:
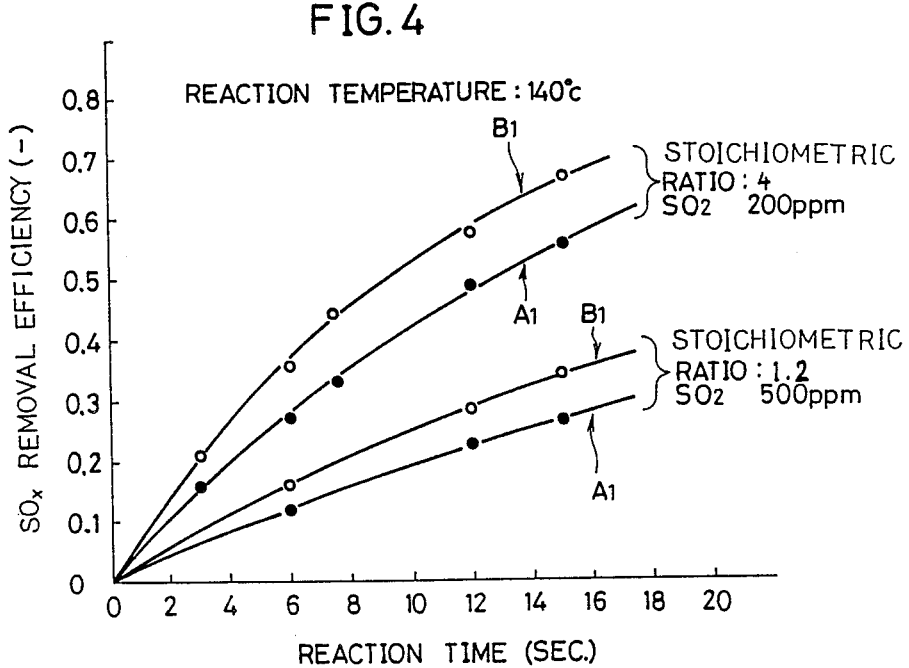
FIG. 4 illustrates relation between reaction time and $SO_x$ removal efficiency in an exemplary use of the present invention.

$SO_x$ concentration was measured at the outlet of a bag filter to calculate $SO_x$ removal efficiency, which are shown in FIG. 4. As shown in FIG. 4, the $SO_x$ removal efficiency is increased with increase in reaction time.

Desulfurization Experiment 3

Figure 5:
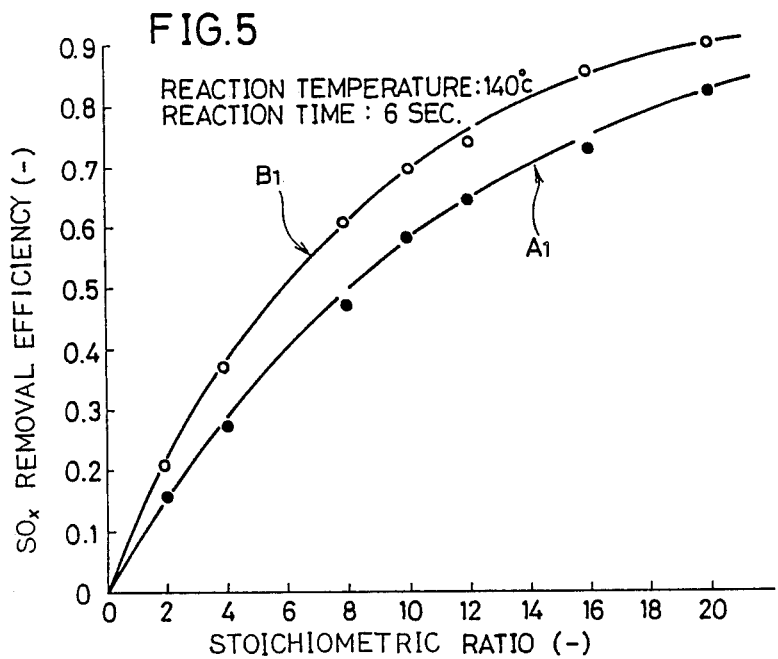
FIG. 5 illustrates relation between stoichiometric ratio and $SO_x$ removal efficiency in an exemplary use of the present invention.

An experimental apparatus identical to that of Experiment 1 was employed to examine the influence exerted by the stoichiometric ratio. A combustion gas of about 140° C., composed of $SO_x$ of 200 p.p.m., $NO_x$ of 100 p.p.m., steam of about 8% and $O_2$ of about 7.5% was introduced into the apparatus at a flow rate of 50 Nm$^3$/h, while the compound sorbents $A_1$ and $B_2$ were injected at rates of 0.39 kg/h, 0.78 kg/h, 1.55 kg/h, 1.94 kg/h, 2.33 kg/h, 3.10 kg/h and 3.88 kg/h respectively, to be dispersed in the gas. In this experiment, the reaction time was set at about six seconds. $SO_x$ concentration was measured at the outlet of a bag filter to calculate $SO_x$ removal efficiency, which are shown in FIG. 5. As shown in FIG. 5, the $SO_x$ removal efficiency is increased with the stoichiometric ratio.

Desulfurization Experiment 4

Figure 6:
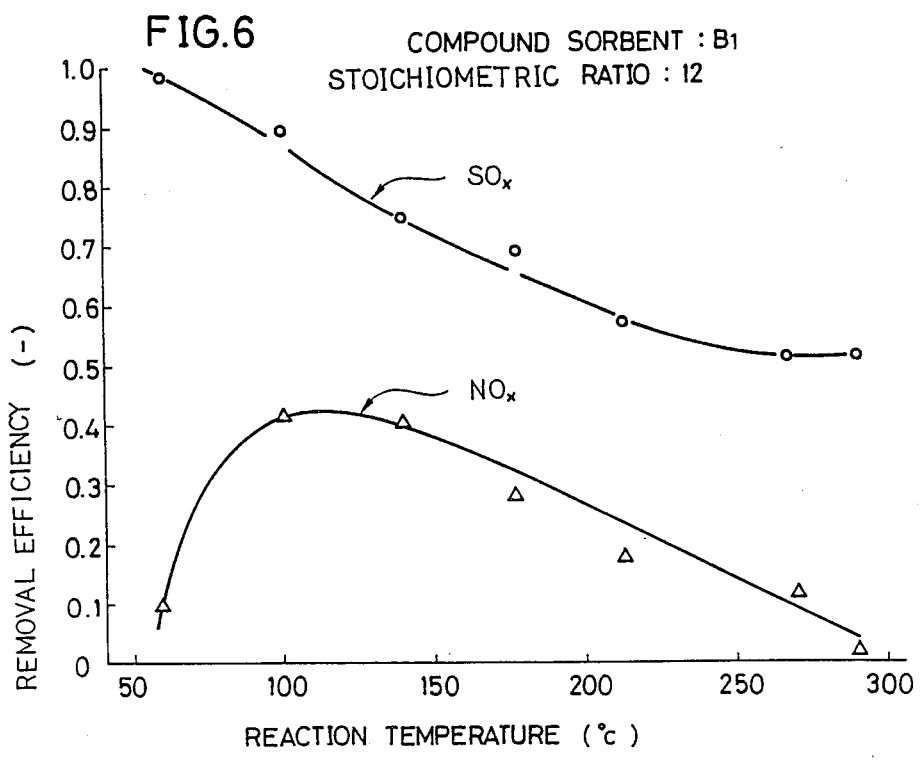
FIG. 6 illustrates a relation between reaction temperature, $SO_x$ removal efficiency and $NO_x$ removal efficiency in an exemplary use of the present invention.

An experimental apparatus identical to that of Experiment 1 was employed to examine the influence of the reaction temperature. Combustion gases adjusted to be at temperatures of about 60° C., 100° C., 140° C., 180° C., 220° C., 260° C. and 300° C., composed of $SO_2$ of 200 p.p.m., $NO_x$ of 100 p.p.m., steam of about 8 to 14% and $O_2$ of about 5 to 15% were introduced into the apparatus at a flow rate of 50 Nm$^3$/h, while the compound sorbent $B_1$ was injected at a rate of 2.33 kg/h to attain a stoichiometric ratio of 12. With respect to the gases of 220° C., 260° C. and 300° C., a steam jacket of a reaction pipe was set at a temperature of 210° C., and reaction temperatures were adjusted by the combustion gas temperatures. $SO_x$ concentration and $NO_x$ concentration were measured at the outlet of a bag filter to calculate $SO_x$ removal efficiency and $NO_x$ removal efficiency, which are shown in FIG. 6. As shown in FIG. 6, the $SO_x$ removal efficiency is reduced as the reaction temperature is increased. The $NO_x$ removal efficiency reaches the highest level around 110° C. Thus, the reaction temperature is set at 75° to 220° C., preferably 85° to 160° C., and more preferably 90° to 130° C. in the present invention.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A dry method of purifying a flue gas containing $SO_x$, $NO_x$, steam and oxygen, including desulfurization thereof, said method comprising the steps of:
    treating a mixture containing lime, gypsum and fly ash with water and steam to form porous compound sorbent particles having a mean particle diameter in the range 3-22 μm;
    injecting said sorbent particles into said flue gas that is at a temperature of 85° to 160° C. to disperse the same therein; and
    separating said dispersed compoundsorbent particles from said flue gas by dust collection means after reaction between said sorbent particles and said $SO_x$ and $NO_x$ for simultaneous removal thereof from the flue gas.

2. A dry method of purifying a flue gas in accordance with claim 1, wherein:
    said compound sorbent particles are not more than 100 μm in mean particles diameter.

3. A dry method of purifying a flue gas in accordance with claim 1, wherein:
    said step of injecting said compound sorbent particles comprises a step of injecting said compound sorbent particles into said flue gas of a temperature of 90° to 130° C.

4. A dry method of purifying a flue gas containing $SO_x$, $NO_x$, steam and oxygen, including desulfurization thereof, said method comprising the steps of:
    injecting fine powder of limestone into a coal-fired boiler furnace discharging said flue gas to thereby obtain a reaction between at least a portion of said SO$_x$ and said limestone powder for an initial desulfurization of said flue gas;

collecting said initially reacted fine powder discharged from said coal fired boiler furnace;

treating said collected initially reacted fine powder with water and steam to form porous compound sorbent particles having a mean particle diameter in the range of 3-20 mm;

injecting said compound sorbent particles into said flue gas that is at a temperature of 85° to 160° C. to disperse the same therein; and separating said dispersed compound sorbent particles from said flue gas by dust collection means after reaction between said solvent particles and NO$_x$ and available SO$_x$ for removal thereof from the flue gas.

5. A dry method of purifying a flue gas in accordance with claim 4, wherein:
said compound sorbent particles are not more than 100 μm in mean particle diameter.

6. A dry method of purifying a flue gas in accordance with claim 4, wherein:
said step of injecting said compound sorbent particles comprises a step of injecting said sorbent particles into said flue gas of a temperature of 90° to 130° C.

7. A dry method of purifying a flue gas in accordance with claim 4, wherein:
said step of preparing said sorbent particles comprises a step of classifying said collected fine powder to remove coarse fly ash.

* * * * *